United States Patent [19]

Papa et al.

[11] 3,974,109

[45] Aug. 10, 1976

[54] POLYURETHANES CONTAINING HALO-ARYL AMIDE-ESTER POLYOLS

[75] Inventors: Anthony Joseph Papa, St. Albans, W. Va.; William Robert Proops, Claymont, Del.

[73] Assignee: Union Carbide Corporation, New York, N.Y.

[22] Filed: July 15, 1974

[21] Appl. No.: 488,495

Related U.S. Application Data

[62] Division of Ser. No. 172,296, Aug. 16, 1971, Pat. No. 3,833,641.

[52] U.S. Cl. .................. 260/2.5 AV; 260/2.5 AM; 260/2.5 AQ; 260/75 NQ; 260/77.5 AQ
[51] Int. Cl.² .................. C08G 18/14; C08G 18/46
[58] Field of Search ............... 260/2.5 AM, 2.5 AQ, 260/2.5 AV, 75 NQ, 77.5 AQ

[56] References Cited
UNITED STATES PATENTS

| | | | |
|---|---|---|---|
| 3,454,530 | 7/1969 | Case | 260/2.5 AV |
| 3,574,167 | 4/1971 | Case | 260/2.5 AV |
| 3,823,176 | 7/1974 | Levis | 260/2.5 AV |

*Primary Examiner*—C. Warren Ivy
*Attorney, Agent, or Firm*—Marylin Klosty

[57] ABSTRACT

Novel aromatic compounds are provided in which the aromatic nucleus has bonded thereto (1) at least one bromine or chlorine atom, (2) an amido group wherein nitrogen is bonded to at least one hydroxyalkyl group or an organic moiety bearing a hydroxyalkyl group, and (3) a hydroxyl-terminated oxyalkylated carboxylic acid ester group. The halogen-substituted aromatic amide-ester polyols of the invention are useful in imparting flame-retardancy to organic polymers normally susceptible to burning including polyurethanes such as, in particular, flexible polyurethane foams.

23 Claims, No Drawings

POLYURETHANES CONTAINING HALO-ARYL AMIDE-ESTER POLYOLS

This is a division of application Ser. No. 172,296 filed Aug. 16, 1971, now U.S. Pat. No. 3,833,641.

The present invention relates to particular novel nitrogen-containing halogen-substituted aromatic polyols, their use as flame-retardants, and to flame-retarded polymer compositions, particularly flexible polyurethane foams, produced therewith.

It is known that polyurethane polymers are manufactured by the reaction of polyfunctional isocyanates and polyfunctional active hydrogen-containing compounds such as, in particular, polyethers and polyesters containing free hydroxyl groups, and that cellular products are provided by effecting the reaction in the presence of a blowing agent. Notwithstanding their many useful properties which have contributed to their acceptance in the transportation, building, household and textile industries, it is recognized that an objectionable characteristic of polyurethanes, particularly when in cellular form, is their risk of flammability in applications where exposure to high temperatures and/or an open flame may be encountered. This problem which also exists with respect to other synthetic polymers including condensation polymers such as thermosetting polyesters, polyepoxides and thermoplastic polyesters, and addition polymers such as polypropylene and polystyrene, has of course received considerable attention with the result that a variety of compounds which are largely phosphorus-containing compounds and halogen-substituted organic compounds, have been reported as effective agents for reducing flammability.

One criterion in determining the efficacy of any particular flame-retarding agent is its ability to improve flame-resistance with minimum impairment of desirable physical and mechanical properties of the polymer. As between various types of polymers including resinous coating compositions and cellular materials ranging from the open cell flexible foams to the closed and more highly cross-linked rigid foams, the flexible cellular polymers are inherently more difficult to flame-proof without substantially upsetting the delicate balance of foam properties and open cell nature. For example, in British Patent Specification No. 1,063,605, it is reported that polyurethane coating compositions of fire-retardant properties are provided by the incorporation therein of 3-bromo-2,2-bis(bromomethyl)-propanol, 2,2-bis(bromomethyl)-1,3-propanediol, or a mixture thereof. The latter brominated diol which is also referred to in the art as dibromoneopentyl glycol, has the structural formula,

(A)

and is designated herein as Compound A. Although the aforesaid patent is not concerned with flame-retarding polyurethane foams, Compound A was tested to determine its efficacy as a flame-retardant of flexible polyether polyurethane foam. The tests revealed that, although Compound A provides self-extinguishing foams, this result is accompanied by a substantial increase in compression set.

A further factor which magnifies the difficulty of providing satisfactory flame-retarded flexible foams is that such foams generally exhibit a greater tendency to ignite at temperatures lower than the combustion temperatures of rigid foams. Thus, a particular compound which may be effective in reducing the flammability of rigid foams, may be too stable at lower temperatures to be an efficient flame-retardant of flexible cellular materials. In the past, flexible polyurethane foams have usually been flame-retarded by the use of halogen- and phosphorus-containing compounds. Of these, the preferred materials have been of the additive type but as such they are gradually lost due to volatilization. It is therefore desirable to employ active flame-retardant agents such as halogen-substituted organic polyols that are reactive with polyisocyanates in forming urethane linkages.

Another problem associated with the objective of improving flame-resistance of cellular polyurethanes is the tendency of many flame-retardants of both the additive and reactive types to cause scorching of the foamed product. This undesirable result is commonly associated with halogen-containing aliphatic flame-retardants and is often attributed to the release of hydrogen halide, particularly hydrogen bromide. For example, although aliphatic compounds containing bromine bonded to a carbon atom beta to an oxygen atom may be capable of imparting flame-retardancy to cellular polyurethanes, such compounds usually suffer the disadvantage of deactivating conventional amine catalysts due to facile release of acidic moieties and cause an undesirable degree of scorching. Although stability toward elimination of hydrogen halide such as that generally associated with vinyl- or aromatically-bound chlorine or bromine, appears necessary to minimize scorch, too high a degree of thermal stability will lower flame-retarding effectiveness particularly for flexible foams which, as previously noted, undergo combustion at relatively low temperatures.

It is desirable, therefore, and is a primary object of this invention to provide novel halogen-substituted aromatic compounds which are useful in the manufacture of polymeric compositions, particularly polyurethanes, of reduced flammability.

Another object is to provide new and improved polyols containing aromatically-bound bromine or chlorine which find particular application as flame-retardants for the formation of self-extinguishing, substantially scorch-free, flexible polyurethane foams of good overal physical and mechanical properties.

Various other objects and advantages of the present invention will become apparent to those skilled in the art from the accompanying description and disclosure.

In accordance with one aspect of the present invention, novel halogen-substituted aromatic amide-ester polyols are provided containing an aromatically unsaturated nucleus to which there is bonded: (1) at least one halogen atom selected from the class consisting of bromine and chloride; (2) the carbon atom of an amido group wherein nitrogen is bonded to at least one hydroxyalkyl group or an organic moiety bearing a hydroxyalkyl group; and (3) a carbonyl group wherein the carbon atom is further bonded to oxygen of an oxyalkylene-containing group which is hydroxyl-substituted.

In accordance with another aspect of this invention, the above-described novel compositions of matter are provided by the reaction of: (1) an aromatic carboxylic acid anhydride or an aromatic diacyl halide wherein the aromatic nucleus is substituted with at least one bromine or chloride atom, (2) an amine having at least one nitrogen-bonded hydrogen atom and wherein nitrogen is further bonded to at least one hydroxyalkyl group or an organic moiety bearing a hydroxyalkyl group, and (3) a vicinal epoxide.

In view of the reactivity of their hydroxyl groups with isocyanato groups of organic polyisocyanates, the halogen-substituted aromatic amide-ester polyols of this invention are useful in the manufacture of polyurethanes. The compositions of this invention are also useful as flame-retardant agents and as such may be incorporated into polymers which are normally susceptible to burning. In view of their reactivity as polyols and ability to impart flame-retardant properties, the compounds described herein are especially useful in providing polyurethanes of reduced flammability.

In accordance with another aspect of this invention, urethane polymers are provided as the products of the method which comprises reacting: (1) an organic polyisocyanate, (2) the halogen-substituted aromatic amide-ester polyols of this invention, and (3) an additional polyol containing an average of at least two hydroxyl groups per molecule such as, in particular, polyether polyols and polyester polyols. This reaction is usually effected in the presence of a catalyst comprising an amine for the OH/NCO urethane-forming reaction. The flame-retarded polyurethanes of the present invention may be produced as flexible, semi-flexible and rigid foams (i.e., cellular polyurethanes), flexible and stiff fibers, coatings, films, elastomers and the like. Notwithstanding the presence of aromatically-bound bromine and/or chlorine, the flame-retarding agents of this invention offer particular advantage in providing flame-retardant flexible polyurethane foams.

One class of novel halo-aryl amide-ester polyols of the present invention are compounds having the following general Formula I:

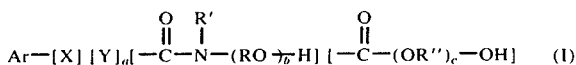

wherein:
Ar represents a benzene or naphthalene nucleus to which the indicated X, Y, amido and ester groups are bonded;
X represents bromine or chlorine;
Y represents X (that is, bromine or chlorine) or hydrogen;
$a$ is an integer having a value of three when Ar is a benzene ring and a value of five when Ar is a naphthalene ring;
R represent a bivalent hydrocarbon group having from 1 to 6 carbon atoms;
$b$ is a number having a value of from 1 to 4;
R' represents hydrogen, an alkyl group having from 1 to 10 carbon atoms, a bromophenyl radical, a chlorophenyl radical, or the group, $-(RO)_b H$, wherein R and $b$ are as aforesaid;
R'' is a bivalent alkylene group having from 2 to 10 carbon atoms; and $c$ is a positive number having an average value of from about 1 to about 3.

When the R' radical bonded to nitrogen of the amido group is hydrogen, an alkyl group or the aforesaid halophenyl radicals, the compounds encompassed by the above Formula I are halo-aryl amide-ester diols and, when R' is a second $-(RO)_b H$ group, the compounds are triols.

The alkyl groups encompassed by R' of Formula I are those of the series, $C_y H_{2y+1}$, wherein y is an integer of from 1 to 10 and is preferably not more than 6, such alkyl groups including linear and branched radicals as exemplified by methyl, ethyl, n-propyl, isopropyl, n-butyl, isobutyl, pentyl, hexyl . . . and decyl radicals, inclusive. Examples of suitable halophenyl radicals included within the definition of R' are bromophenyl, 2,4-dibromophenyl, 2,4,6-tribromophenyl, pentabromophenyl and corresponding chlorophenyl radicals.

Illustrative of suitable bivalent hydrocarbon radicals represented by R of the nitrogen-bonded $-(RO)_b H$ group of Formula I are the linear and branched alkylene radicals of the series, $C_x H_{2x}$, wherein x has a value of from 1 to 6 and is preferably not more than 4, such as methylene, ethylene, trimethylene, propylene, tetramethylene, isobutylene and hexylene. When $b$ of the $-(RO)_b H$ group of Formula I has a value of one, $-ROH$ is a hydroxyalkyl group and, when $b$ is greater than one, the R radical $-C_x H_{2x}-$, has at least 2 carbons (i.e., x is at least 2) and nitrogen of the amido group is bonded to carbon of a hydroxyl-terminated poly(alkyleneoxy) group.

The preferred type of bivalent alkylene radical (R'') of the ester group of the compounds of this invention including the class depicted by Formula I above, has the more specific structure:

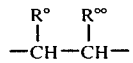

wherein R° and R^∞ represent hydrogen or a lower alkyl radical, and may be the same or different, and R^∞ may additionally be phenyl, a chloro(lower) alkyl or a bromo(lower)alkyl radical, the term "lower" as used herein denoting from 1 to 4 carbon atoms. Typical examples of bivalent radicals encompassed by R'' of general Formula I above are: ethylene, propylene $[-CH_2 CH(CH_3)-]$, n-butylene, isobutylene, 1-methyl-2-ethyl-ethylene, 1-methyl-2-pentyl-ethylene, chloromethyl-ethylene and phenyl-ethylene.

A second class of novel halo-aryl amide-ester polyols of the present invention are compounds represented by the following general Formula II:

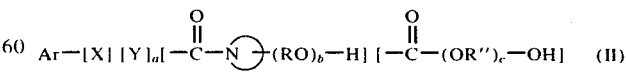

wherein Ar, X, Y, R, R'', $a$, $b$ and $c$ are as above-defined and

represents a saturated heterocyclic nucleus having from 3 to 6 members and from 0 to 1 additional heteroatoms such as nitrogen, oxygen or sulfur, and may be fused to an aromatically unsaturated carbocyclic nucleus such as a fused benzene ring. Illustrative of the heterocyclic structures encompassed by

are those of ethyleneimine, pyrrolidine, imidazolidine, oxazolidine, thiazolidines, benzothiazolidines, piperidine, piperazine and morpholine. When only the one hetero-nitrogen atom of the

group is present, the —$(RO)_b$H radical is bonded to a carbon atom of the cyclic nucleus. In the heterocyclic structure having two nitrogen atoms such as the piperazine ring, the —$(RO)_b$H group may be bonded to either carbon or the second nitrogen atom.

In the above Formulas I and II, the X substituent (bromine or chlorine) and the ester group may be bonded to any one of the carbon atoms in the ortho, meta or para positions to the amido group, and the Y groups (bromine, chlorine or hydrogen) satisfy the remaining valences of the aromatic nucleus (Ar). Further, the y substituents may be the same as or different from one another and, when Y is chlorine or bromine, Y may be the same as or different from the X substituent.

With respect to the aromatic nucleus (Ar) of the halo-aryl amide-ester polyols described herein, it is preferred that the bromine or chlorine substituent (X) be in an ortho position to the amido group as depicted by the folllowing Formulas I-1 and II-1 which correspond to the above Formulas I and II, respectively, except that the aromatic nucleus is specifically illustrated as a benzene ring:

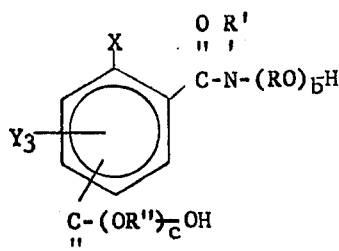

I-1

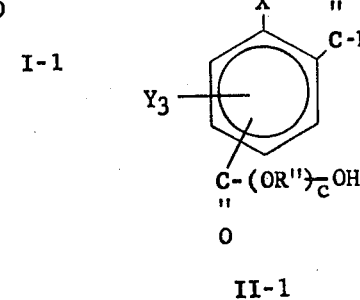

II-1 wherein X, Y, R, R′, R″,

b and c have the above-defined significance. Similarly, when the aromatic nucleus is a naphthalene ring, the X and amido groups are preferably ortho to one another such as when in the 1- and 2- positions, respectively. It is preferred that the amide-ester polyols of this invention contain at least one additional aromatically-bound bromine or chlorine substituent, that is, at least one of the y groups is also an X substituent. When the aromatic nucleus (Ar) is a benzene ring as shown in Formulas I-1 and II-1 above, and the ester group is either meta or para to the amido group, the second halogen substituent is also preferably ortho to the amido group; otherwise, the second halogen substituent is uaually ortho to the ester group. When the aromatic nucleus is a naphthalene ring, the second halogen substituent is also preferably ortho to the amido group unless the ester group satisfies that position in which event the second halogen is preferably ortho to the ester group.

The most preferred structures of the halo-aryl groups, that is, the Ar-[X] [Y]$_a$ portion of the compounds of this invention, are as follows:

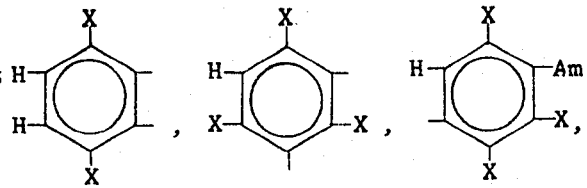

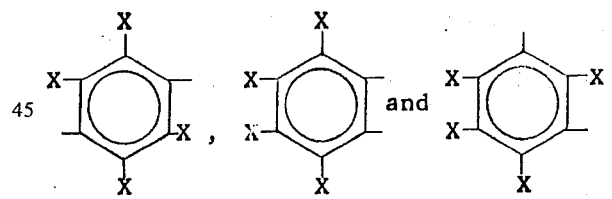

wherein X is bromine or chlorine, and the two unsatisfied valences of the ring are bonded to the amido and ester groups, respectively, and, as shown in the third structure, when three halogen substituents are present in other than the meta position to one another, two of the halogens are both ortho to the amido group (Am).

A more specific class of the halo-aryl amide-ester polyols of this invention are compounds wherein the nitrogen of the amido linkage is bonded to two hydroxy(lower)alkyl groups and the oxyalkylene portion of the ester group is formed of units of oxyethylene, oxypropylene or a combination of such units, as illustrated by the following Formula I-2:

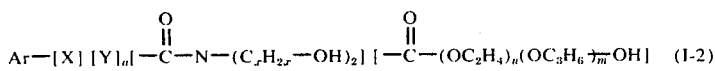

$$Ar-[X][Y]_a[-\overset{O}{\underset{\|}{C}}-N-(C_xH_{2x}-OH)_2][-\overset{O}{\underset{\|}{C}}-(OC_2H_4)_n(OC_3H_6)_{\overline{m}}OH] \quad (I\text{-}2)$$

wherein Ar, X, Y and $a$ are as above-defined, $x$ has a value of from 1 to 4, and is most preferably at least 2, and $n$ and $m$ may each have a value of from 0 to 3, provided the average value of the sum $n+m$ is from about 1 to about 3.

The aromatic reactants employed in producing the novel polyols of this invention are halogen-substituted aromatic acid anhydrides and diacyl halides which are the source of the aromatic nucleus (Ar), the X and Y substituents, and the —C(O) groups of the amido and ester groups. Thus, the aromatic reactants include compounds having the formulas:

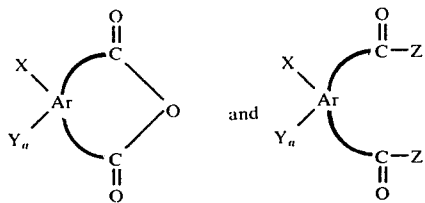

wherein Ar, X, Y and $a$ are as above-defined with reference to Formulas I and II, and Z represents bromine or chlorine.

In accordance with one embodiment of the method for preparing compounds having Formulas I-1 and II-1 above, the aromatic reactant is a phthalyl anhydride in which the benzene ring is substituted with from 1 to 4 bromine atoms, chlorine atoms or a combination thereof, including mono-, di-, tri- and tetra-halo substituted phthalic anhydrides. The preferred anhydride reactants are those having at least two such halogen substituents (that is, bromine and/or chlorine) which are preferably bonded to the 3,6-carbon atoms of the ring, that is, ortho to the anhydride group as shown by the formula:

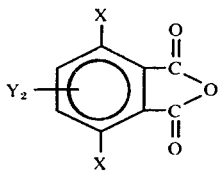

wherein X is bromine or chlorine, and Y is X or hydrogen.

In accordance with another embodiment of the method by which compounds having Formulas I-1 and II-1 above are produced, the aromatic reactant is a phthaloyl chloride or bromide including phthaloyl, isophthaloyl and terephthaloyl halides having the following formula:

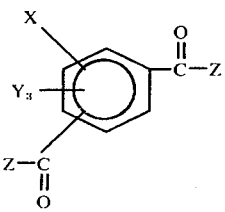

wherein X and Y are as above-defined, and Z is chlorine or bromine. With respect to this class of aromatic reactants, it is also preferred that at least one of the Y substituents is chlorine or bromine and that both halogens are positioned ortho to the respective acyl halide groups.

The most preferred aromatic reactants for use in preparing the amide-ester polyols of this invention are the tetrahalophthalic anhydrides and the tetrahalophthaloyl halides, wherein halogen in each instance is bromine and/or chlorine.

Illustrative of suitable aromatic acid anhydrides an diacyl halides for use in preparing the amide-ester polyols of this invention are: 3-chlorophthalic anhydride; 3-bromophthalic anhydride; 3,6-dibromophthalic anhydride; 1,4-dichloro-2,3-naphthalene-dicarboxylic acid anhydride; 1,4-dibromo-2,3-naphthalene-dicarboxylic acid anhydride; tetrachlorophthalic anhydride; tetrabromophthalic anhydride; tetrachloroterephthaloyl chloride; tetrabromoterephthaloyl chloride; tetrabromoisophthaloyl chloride; and tetrachloroisophthaloyl chloride.

The amine reactants employed in producing the haloaryl amide-ester polyols of this invention contain a primary or secondary amino group and at least one hydroxyl group. The hydroxyl group is present as a hydroxyalkyl radical having from 1 to 6 carbon atoms or as a hydroxyl-terminated poly-(alkyleneoxy) radical. Preferably, the hydroxyl group is primary or secondary, although tertiary hydroxyls may be present without departing from the scope of this invention. In the primary amines, nitrogen is bonded directly to a carbon atom of the hydroxyalkyl or hydroxyl-terminated poly-(alkyleneoxy) groups. The secondary amine reactants include compounds wherein at least one of the two valences of the secondary amino group $$(H-\underset{|}{N}-)$$

is satisfied by a bond to a carbon atom of the hydroxyalkyl or hydroxyl-substituted poly(alkyleneoxy) groups, and the second valence is either similarly satisfied or is bonded to an alkyl radical or an halophenyl radical wherein halogen is bromine or chlorine. The secondary amine reactant may also be a compound wherein both valences of the

group are satisfied by bonds to carbon atoms of a saturated three- to six-membered heterocyclic nucleus of which the essential secondary nitrogen atom is a member and to which nucleus the hydroxyalkyl or hydroxyl-substituted poly(alkyleneoxy) group is bonded. The five- and six-membered heterocycles may contain an oxygen, sulfur or second nitrogen atom as part of the ring, and may be fused to an aromatically unsaturated carbocyclic nucleus.

Thus, in preparing the halo-aryl amide-ester polyols having the formulas depicted as Formulas I and II above, suitable classes of amines are:

1. the aminoalcohols having the formula,

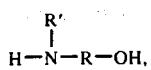

2. the alkyleneoxy derivatives of the aforesaid aminoalcohols, that is, primary and secondary amines having the formula,

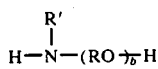

(where $b$ is from 2 to 4), and 3. heterocyclic secondary amines having the formula,

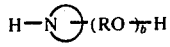

(where $b$ is from 1 to 4); wherein the R, R' and

groups in each instance are as above-defined.

A more specific class of the aminoalcohol reactants are those having the general formula,

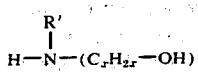

wherein $x$ preferably has a value of from 1 to 4, and R' is hydrogen, an alkyl group having from 1 to 6 carbon atoms, or a hydroxy(lower)alkyl group (that is, $-C_xH_{2x}-OH$, where $x$ is from 1 to 4). Particularly preferred are the secondary aminoalcohols having the formula, $H-N(C_xH_{2x}-OH)_2$, wherein $x$ is from 2 to 4.

Typical examples of suitable amine reactants for use in producing the novel compounds of this invention are: monoethanolamine; 2-amino-1-propanol; monoisopropanolamine; 2-amino-1-butanol; N-methylethanolamine; N-butylethanolamine; diethanolamine; diisopropanol amine; dibutanolamine; dihexanolamine; N-(2-hydroxyethyl)bromoanilines such as N-(2-hydroxyethyl)-2,4-dibromoaniline, N-(2-hydroxyethyl)-2,4,6-tribromophenylaniline, N-(2-hydroxyethyl)pentabromoaniline; N-(2-hydroxyethyl)chloroanilines such as N-(2-hydroxyethyl)pentachloroaniline; N-(2-hydroxyethyl)piperazine; 2-hydroxyethylmorpholines; 2-hydroxyethylpyrrolidines; 2-hydroxyethylpiperidines; N-(2-hydroxyethyl)imidazolidine; hydroxy(lower)alkyloxazolidines, -thiazolidines and benzothiazolidines; and alkylene oxide adducts of any of the aforesaid such as the ethylene oxide adduct of isopropanolamine, $HO(C_2H_4O)_2C_3H_6NH_2$.

The vicinal epoxide reactant employed in producing the halo-aryl amide-ester polyols of this invention, is the source of the $-(R''O)_c-$ grouping of Formulas I and II above and thus, for convenience, may be shown as

wherein the oxy group bridges two adjacent carbon atoms of the bivalent alkylene group, R'', having from 2 to 10 carbon atoms. The preferred vicinal epoxides for use in preparing the halo-aryl amide-ester polyols of this invention have the formula,

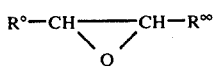

wherein R° and R∞ represent, as above-defined, hydrogen or a lower alkyl radical, and may be the same or different, and R∞ may additionally be phenyl, a chloro(lower)alkyl or a bromo(lower)alkyl radical. Illustrative of suitable vicinal epoxides are: ethylene oxide, propylene oxide, butylene oxide (1,2- or 2,3-), 2,3-epoxypentane, 3,4-epoxyhexane, 2,3-epoxyheptane and other such epoxy-pentanes, -hexanes, -heptanes .. -decanes, inclusive: 3-chloro-1,2-epoxypropane (epichlorohydrin), 3-chloro-1,2-epoxybutane and styrene oxide. It is to be understood that in producing the novel halo-aryl amide-ester polyols of this invention, more than one alkylene oxide reactant may be employed. Especially preferred are ethylene oxide and propylene oxide used singly or in combination.

The reaction of the above-described halo-aromatic carboxylic acid anhydrides or diacyl halides, hydroxyl-containing primary or secondary amines and alkylene oxide to form compositions comprising the novel halo-aryl amide-ester polyols of this invention is shown by the following equation (1) wherein, for the purpose of illustration, the aromatic anhydrides and the preferred amine and alkylene oxide reactants are shown:

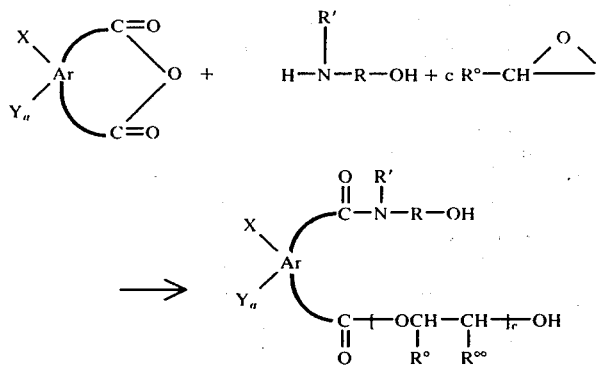
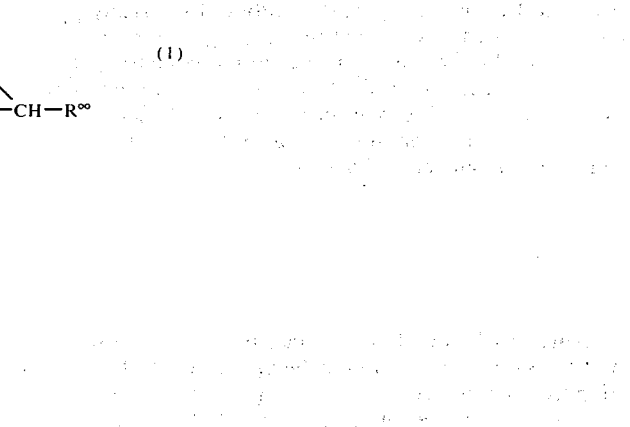

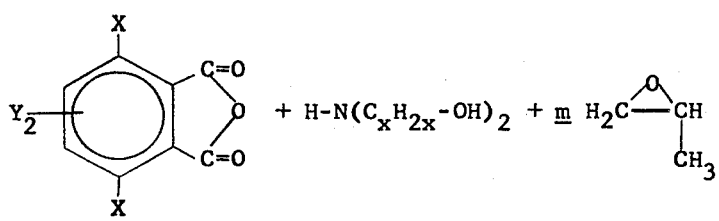

wherein Ar, X, Y, R, R', R°, R∞, a and c are as defined hereinabove.

In accordance with a particularly preferred embodiment of this invention, a phthalic acid anhydride having at least two bromine and/or chlorine atoms ortho to the anhydride group, is reacted with an N,N-di[hydroxy(-lower)alkyl]amine having the formula, $H-N(C_xH_{2x}-OH)_2$, wherein $x$ has a value of from 1 to 4, and either propylene oxide, ethylene oxide or a combination of ethylene and propylene oxides, as shown by the following equation (2):

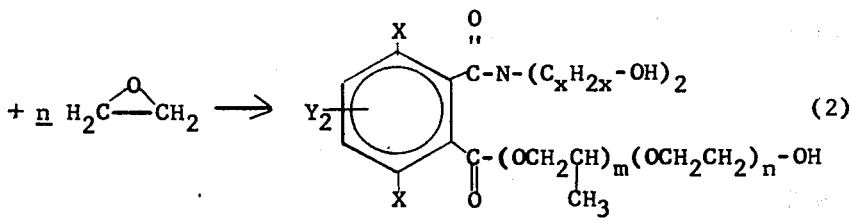

wherein X is bromine or chlorine; $x$ has value of 1 to 4, $n$ and $m$ may each have a value from 0 to about 3, provided the sum $n+m$ has an average value of from about 1 to about 3.

In producing the halo-aryl amide-ester polyols of this invention, the above-described aromatic, amine and vicinal epoxide reactants are reacted at a temperature between about 100° and about 150°C. A temperature of at least about 100°C. is usually necessary to obtain a good rate of reaction. Temperatures above about 150°C. are avoided in order to substantially prevent polymer build-up and eventually crosslinking via exchange reactions. The reaction is preferably effected at a temperature between about 115° and about 130°C.

The reaction may be carried out in the presence or absence of a diluent. When employed, suitable diluents include: aromatic hydrocarbons such as benzene, xylene, toluene; the various chlorinated benzenes such as, for example, chlorobenzene and ortho-dichlorobenzene; dimethoxyethylene glycol; dimethoxydiethyl ether; dioxane; dimethylformamide; dimethyl sulfoxide; or any other normally liquid material which is also liquid within the aforesaid temperature range and nonreactive under the reaction conditions. The reaction is usually carried out at substantially atmospheric pressure.

The reaction for producing the polyols of this invention may be carried out in the presence or absence of a catalyst. When used, the catalyst is a basic material including the oxides, hydroxides and organic salts of the alkali metal, alkaline earth metals, and heavy metals such as zinc and lead. Illustrative of suitable catalysts are one or more of the following: lithium, sodium and potassium acetates; magnesium, barium, calcium, lead and zinc oxides; and potassium, calcium and barium hydroxides.

The relative proportions of the aromatic, amine and alkylene oxide reactants may vary over a relatively wide range without departing from the scope of this invention. Usually between about 0.5 and about 1.2 mols of the amine reactant is employed per mol of the aromatic acid reactant. The relative proportion of alkylene oxide employed depends largely on the proportion of such units which is desired in the final product. Usually the alkylene oxide is used in an amount between about 0.8 and about 4 mols per mol of aromatic reactant.

The reaction is continued at least until substantially all of the dicarboxylic acid anhydride or acyl halide has been reacted. This point can be determined by periodic checking of the acidity of the reaction mixture by conventional means such as, for example, by titrating with an aqueous sodium hydroxide solution. When the product of the reaction of equation (1) has an acid number greater than about 1.0 mg. KOH/gram and is to be used as the flame-retardant component of polyurethane reaction mixtures containing an amine catalyst, it is usual practice to subject the product to further purification to reduce the acid number to less than about 1 and preferably to less than 0.5 mg. KOH/gram. This is readily accomplished by treating the product with any relatively weak alkaline material such as sodium bicarbonate.

The product is recovered by any conventional technique such as distillation or extraction of the product remaining after removal of volatile components.

In addition to polyurethanes, the halo-aryl amide-ester polyols described herein can also be used to impart flame-retardancy to other solid synthetic organic polymers which are normally susceptible to burning. Among such additional polymers are: thermosetting polyesters; polyepoxides; thermoplastic polyesters; and polymers derived from ethylenically unsaturated monomers such as ethylene, propylene, styrene, alkyl-substituted styrenes, lower alkyl acrylates and methacrylates, vinyl acetate, and other resinous polymers well known to the art.

The amount of the halo-aryl amide-ester polyol which is incorporated into any particular polymer composition depends on several factors including the degree of flame-retardancy desired, whether one or more additional flame-retarding agents are employed, the chemical composition of the polymeric material, the physical nature (i.e., cellular or non cellular), and, with respect to cellular polymers, the nature of the cellular structure (i.e., flexible, semi-flexible or rigid). Generally, the polymer compositions of this invention including urethane polymers contain between about 1 and about 25 weight percent of the novel halo-aryl amide-ester polyols, or amounts sufficient to introduce a bromine, chlorine or combined halogen content of between about 0.2 and about 8 weight percent. In providing cellular polyurethanes of reduced flammability, the halo-aryl amide-ester polyols are usually used in amounts sufficient to incorporate in the polymer at least about 0.5 and no more than about 8 weight percent bromine and/or chlorine, based on the combined weight of the polyisocyanate and total polyol reactant including the novel polyols of this invention. In producing flame-retarded flexible polyurethane foams, it is usually preferred to employ the halo-aryl amide-ester polyols in an amount sufficient to incorporate a total bromine and/or chlorine content of at least about 2 weight percent, expressed on the aforesaid basis. When it is desired to provide flexible foams having a self-extinguishing rating (by flammability test ASTM D 1692-67 T), the flame-retarding agents of this invention are employed in amounts sufficient to incorporate at least about 3 weight percent total halogen, expressed on the aforesaid basis.

The polyisocyanates used in the manufacture of polyurethanes are known to the art and any such reactants are suitably employed in producing the flame-retarded compositions of this invention. Among the suitable polyisocyanates are those represented by the general formula:

wherein: $i$ has an average value of at least two, and Q is an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene or aralkylene radical including corresponding halogen-substituted radicals. Typical examples of suitable polyisocyanates for use in preparing the flame-retarded polyurethane of this invention are: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,3-phenylenediisocyanate, 4-chloro-1,3-phenylenediisocyanate, 4-bromo-1,3-phenylenediisocyanate, 5,6-dimethyl-1,3-phenylenediisocyanate, 2,4- and 2,6-tolylene diisocyanates, crude tolylene diisocyanate, 6-isopropyl-1,3-phenylenediisocyanate, durylene diisocyanate and triphenylmethane-4,4',4''-triisocyanate. Other suitable polyisocyanate reactants are ethylphosphonic diisocyanate and phenylphosphonic diisocyanate. Also useful are the polyisocyanates of the aniline-formaldehyde polyaromatic type which are produced by phosgenation of the polyamine obtained by acid-catalyzed condensation of aniline with formaldehyde. Polyphenylmethylene polyisocyanates of this type are available commercially under such trade names as PAPI, AFPI, Mondur MR, Isonate 390P, NCO-120, NCO-10 and NCO-20. These products are low viscosity (50–500 centipoises at 25°C.) liquids having average isocyanato functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates; and a mixture of isomeric tolylene diisocyanates with polymeric tolylene diisocyanates obtained as residues from the manufacture of the diisocyanates.

The amount of polyisocyanate employed varies slightly depending upon the nature of the polyurethane being prepared. In general, the polyisocyanates are employed in amounts that provide from 80 to 150 percent, preferably from 90 to 120 percent of the stoichiometric amount of the isocyanato groups required to react with all of the hydroxyl groups present in the other reactants of the polyurethane-producing reaction mixture, including the hydroxyl groups of the halo-aryl amide-ester polyols described herein, the additional polyol reactants described below and any water which may be present as a source of blowing action.

In producing the flame-retarded urethane polymers of the present invention, one or more polyols in addition to the halo-aryl amide-ester polyols of the present invention is employed in the reaction with the organic polyisocyanate. Such additional active hydrogen-containing compounds have an average of at least two hydroxyl groups per molecule and include compounds which consist of carbon, hydrogen and oxygen and compounds which also contain phosphorus and/or halogen. Suitable classes of such active hydrogen-containing compounds are polyether polyols, polyester polyols, lactone polyols and phosphorus-containing polyols.

Among the suitable polyether polyols that can be employed are the alkylene oxide adducts of water or any of the following polyhydroxyl-containing organic compounds: ethylene glycol; diethylene glycol; propylene glycol; dipropylene glycol; trimethylene glycol; butylene glycols; glycerol; 1,2,6-hexanetriol; 1,1,1-trimethylolethane; 1,1,1-trimethyolpropane; 3-(2-hydroxyethoxy)-1,2-propanediol; pentaerythritol; 1,2-cyclohexanediol; sorbitol; sucrose; lactose; glycosides such as alpha-methylglucoside and alpha-hydroxyalkyl glucoside, fructoside and the like; compounds in which hydroxyl groups are bonded to an aromatic nucleus such as resorcinol, pyrogallol, phloroglucinol, di-, tri-, and tetra-phenylol compounds such as bis-(p-hydroxyphenyl)-methane and 2,2-bis-(p-hydroxyphenyl)-propane, and many other such polyhydroxyl compounds know to the art. The alkylene oxides employed in producing polyether polyols, which are also known as poly(oxyalkylene) polyols, usually have from 2 to 4 carbon atoms and are preferably ethylene oxide, propylene oxide and any combination thereof. In the preparation of mixed poly(oxyethylene-oxypropylene) polyols, the ethylene and propylene oxides may be added to the hydroxyl-containing reactant either in admixture or sequentially.

Suitable polyester polyols for use in the manufacture of polyurethanes are the reaction products of: (1) one or more of the aforesaid polyether polyols or the polyhydroxyl-containing organic compounds which are reacted with alkylene oxide to produce such polyether polyols, and (2) a polyfunctional organic carboxylic acid including aliphatic and aromatic acids. Typical examples of suitable polycarboxylic acids that can be employed in producing polyester polyols are: succinic, adipic, sebacic, azelaic, glutaric, pimelic, malonic and suberic acids; and aromatic acids such as phthalic, terephthalic and isophthalic acids and the like.

Other suitable polyols for use in the manufacture of the flame-retarded polyurethanes of this invention are: lactone-based polyols prepared by reacting a lactone such as epsilon-caprolactone or a mixture of epsilon-caprolactone and an alkylene oxide with a polyfunctional initiator such as a polyhydric alcohol, an amine, or an aminoalcohol; and phosphorus-containing polyols such as the alkylene oxide adducts of phosphoric acid, polyphosphoric acids such as tri- and tetra-phosphoric acids, organo-substituted phosphoric acids such as benzenephosphoric acid and the like.

The particular polyol reactant or combination of polyols employed depends upon the end-use of the polyurethane product which in turn determines whether the product is to be provided as a flexible or rigid material. For this purpose, the polyol reactant is usually characterized by its hydroxyl number which is defined as the number of milligrams of potassium hydroxide required for the complete neutralization of the hydrolysis product of the fully acetylated derivative prepared from 1 gram of polyol or mixtures of polyols. The hydroxyl number can also be defined by the equation:

$$OH = \frac{56.1 \times 1000 \times f}{M.W.}$$

wherein $OH$ = hydroxyl number of the polyol $f$ = average functionality, that is, average number of hydroxyl groups per molecule of polyol $M.W.$ = average molecular weight of the polyol In producing rigid polyurethanes, the polyol preferably possesses a hydroxyl number from about 200 to about 1000. In producing semi-flexible materials, the hydroxyl number is usually from about 100 to about 250. Lower hydroxyl numbers from about 32 to about 150 are usually appropriate for the polyols employed in producing flexible polyurethanes. These ranges of hydroxyl numbers are not intended to be restrictive but are merely presented as illustrative of the relatively large number of possible polyols and combinations thereof that can be employed.

The urethane-forming reaction is usually carried out in the presence of a minor amount of a catalyst comprising an amine. Suitable amine catalysts include one or more of the following: N-methylmorpholine; N-ethylmorpholine; N-octadecylmorpholine; triethylamine; tributylamine; trioctylamine; N,N,N'N'-tetramethylenediamine; N,N,N',N'-tetramethyl-1,3-butane-diamine; triethanolamine; N,N-dimethylethanolamine; triisopropanolamine; N-methyldiethanolamine; bis(2-dimethylaminoethyl)ether; hexadecyldimethylamine; N,N-dimethylbenzylamine; trimethylamine; triethylenediamine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol; dipropylene glycol; and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of polyol reactant.

In producing polyurethanes from polyether polyols it is often desirable to include as a further component of the reaction mixture a minor amount of certain metal catalysts. Such supplementary catalysts are well known to the urethane art. For example, useful metal catalysts include organotin compounds, particularly tin compounds of carboxylic acids such as stannous octoate, stannous oleate, stannous acetate, stannous laurate, dibutyltin dilaurate, and other such tin salts. Additional metal catalysts are organo-compounds of other polyvalent metals such as zinc and nickel (e.g., nickel acetylacetonate), or other such metal catalysts which are well known in the art of flexible polyether urethane foam manufacture. The amount of each such metal catalyst which can be present in the polyurethane-producing reaction mixture is from about 0.05 to about 2 parts by weight per 100 parts by weight of the polyether polyol starting material.

When it is desired to provide cellular polyurethanes, the reaction mixture also includes a minor amount of a foaming or blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80°F. and above minus 60°F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Illustrative of the fluorocarbon blowing agents are trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. When producing flexible foams, the generally preferred method of foaming is the use of water or a combination of water plus a fluorocarbon blowing agent such as trichloromonofluoromethane. On the other hand, in producing rigid foams the blowing agent is usually one of the aforesaid halogenated compounds.

The amount of blowing agent employed in the foaming reaction will vary with factors such as the density that is desired in the foamed product. Usually, however, from about 1 to about 30 parts by weight of the blowing agent per 100 parts by weight of polyol is employed.

In producing flame-retarded cellular polyurethanes in accordance with the method of this invention, a minor amount of a foam stabilizer is also usually present as an additional component of the reaction mixture. When used, the foam stabilizer is usually a poly(siloxane-oxyalkylene) block copolymer and may be any of such copolymers described in the art. Generally, the block copolymers comprise: (1) siloxy units having the formula, $Z_2SiO$, (2) polyether-substituted siloxy units having the general formula, $Z°O(C_nH_{2n}O)_xC_mH_{2-m}Si(Z)O$, and (3) siloxy units having the formula, $Z_3SiO_{1/2}$, where: Z in each instance is a monovalent hydrocarbon group having from 1 to 12 carbon atoms such as alkyl and aryl groups, in particular methyl; Z° is either Z, Z—C(O) or hydrogen wherein Z is as aforesaid; —$C_mH_{2m}$— is a bivalent hydrocarbon radical, usually of 2 to 5 carbon atoms, that links the respective silicon atoms of the polyether-substituted siloxy units to the polyether block, $Z°O(C_nH_{2n}O)_x$, in which n has a value of from 2 to 4 and the average value of x is such that the average molecular weight of the polyether block is from about 200 to about 6000. Illustrative block copolymers for use as foam stabilizers in the foaming reaction of this invention are, for example, the copolymers described in U.S. Pat. Nos. 2,834,748; 2,917,480; 3,505,377; 3,507,815; 3,563,924; and in U.S. patent application Ser. No. 109,587, filed Jan. 25, 1971 now abandoned. Such copolymer compositions are incorporated herein by reference to the aforesaid patents and application. When used, the foam stabilizer is present in the polyurethane-forming reaction mixture in an amount within the range of from about 0.2 to about 5 parts by weight or more, per 100 parts by weight of the polyol reactant.

The flame-retarded urethane polymers of the invention can take the form of foamed products, elastomers, surface coatings, castings and the like, and may be formed in accordance with any of the processing techniques known to the polyurethane art such as the "one-shot", quasi-prepolymer and prepolymer techniques. For example, in accordance with the one-shot process, foamed products are produced by carrying out the reaction of the polyisocyanate, the halo-aryl amide-ester polyols of this invention and the additional polyol simultaneously with the foaming operation. In preparing the foamed products in accordance with the quasi-prepolymer technique, the polyisocyanate is first reacted with a portion of the polyol to give a product having a high percentage of free-NCO groups (e.g., from 20 to 50 per cent), and the product is subsequently foamed by reaction with additional polyol and foaming agent. In the prepolymer technique, the isocyanate is reacted with a slightly less than stoichiometric quantity of polyol to form a prepolymer having a low percentage (e.g., from 1 to 10 per cent) of free-NCO groups, followed by reaction of the prepolymer with a blowing agent such as water to form the cellular material. In these various multi-stage methods, the halo-aryl amide-ester polyols described herein may be incorporated at any stage and prereacted with the polyisocyanate as the sole polyol reactant or in combination with the second type of polyol reactants described above. Elastomers and castings are formed by reaction of the aforesaid prepolymer with a cross-linking agent having reactive hydrogens such as a diamine as typically exemplified by a bis-(aminochlorophenyl)methane. Curing of the prepolymer by atmospheric moisture provides surface coatings.

If desired other additional ingredients can be employed in minor amounts in producing the polyurethane foams in accordance with the process of this invention. Illustrative of such other additives that can be employed are: additional flame-retarding agents, cross-linking agents such as glycerol, triethanolamine and their oxyalkylene adducts, as well as fillers, dyes, pigments, anti-yellowing agents and the like.

The flame-retarded polyurethanes produced in accordance with the present invention are used in the same areas as conventional polyurethanes and are especially useful where fire resistance properties are required. Thus the polymers are useful as textile interliners, cushions, mattresses, paddings, carpet underlay, packaging, gaskets, sealers, thermal insulators and the like.

The following examples are merely illustrative of the present invention and are not intended as a limitation upon the scope thereof.

EXAMPLE I

Preparation of N,N-di(2-hydroxyethyl)amide-oxypropylated ester derivative of tetrabromophthalic anhydride To a slurry of 1856 grams (4.0 mols) of tetrabromophthalic anhydride in 2500 ml. of xylene maintained at 115°–120°C. there was added dropwise, but intermittently with propylene oxide, as described subsequently, a total of 425 grams (4.0 mols) of diethanolamine. When one-half of the diethanolamine had been added, the thick reaction slurry was stirred for 1 hour and propylene oxide (150 grams) was added to facilitate stirring. The propylene oxide reacted instantaneously, as indicated by the lack of reflux, and the remainder of the diethanolamine was added dropwise.

The addition of diethanolamine took a total of about 1.5 hours. When the addition of diethanolamine was complete, additional propylene oxide was then added dropwise to the reaction mixture while maintaining the temperature at 115°–120°C. Acid number determinations were made of reaction mixture aliquots at regular intervals until a value of less than 0.50 was obtained. A good indication of complete reaction was obtained when propylene oxide reflux had commenced which occurred when a total of 427 grams (7.36 mols) of propylene oxide had been added. At this point the reaction mixture consisted of two separate liquid phases. Upon allowing the product to stand for 3 days in a separatory funnel, the two layers separated. The viscous ($\eta^{50°}$ 103,600 centipoise) product layer (2250 grams) was stripped of volatiles by passage through a falling film still at 115°C. and 20 mm. pressure. After stripping, the residue product (1764 grams) was a glassy solid having a melt temperature of 54°–74°C. The acid number was nil. Upon analysis, the residue product was found to have a bromine content of 50.64 weight per cent and a Hydroxyl No. (as determined by conventional procedure) of 246 mg. KOH/-gram. The structure assigned to the main portion of the product is as follows:

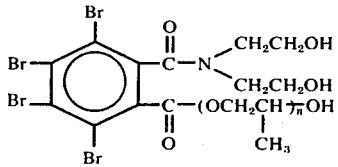

On the basis of the aforesaid Hydroxyl No. of 246, the calculated bromine content is 46.7 weight per cent and the average value of $n$ is 2. On the basis of the aforesaid bromine analysis (50.46 weight per cent Br), the calculated Hydroxyl No. is 268 and the average value of $n$ is one. The reaction product of this example was employed in the preparation of flexible polyurethane foams as described in the following examples.

EXAMPLES II–V

In accordance with these examples, flexible polyurethane foams were prepared by reacting and foaming a reaction mixture containing a polyisocyanate, the tetrabromophthalyl amide-ester triol produced in accordance with Example I above, a polyether polyol, water as the source of blowing action, an amine catalyst, stannous octoate and a silicone surfactant as the foam stabilizer. Flexible polyurethane foams were also prepared in which either: (1) no flame-retardant was addded (control Run No. K), or (2) the known aliphatic flame-retardant, dibromoneopentyl glycol, designated herein as Compound A, was incorporated (comparative Run No. C).

In each of Examples II–V and Run Nos. K and C, the foam formulation contained the components identified in the following Table I wherein the relative proportions are expressed on the standardized basis of 100 parts by weight of polyether polyol, although the foams were produced on five times the scale.

TABLE I

| Component | FOAM FORMULATION A Parts by Weight |
|---|---|
| Polyether Polyol having a hydroxyl number of 56 produced by reacting glycerol and propylene oxide | 100 |
| Tolylene Diisocyanate (Index 105) /1/ | Varied /3/ to obtain Index 105 |
| Water | 4 |
| Bis-[2-(N,N-dimethylamino)ethyl]ether employed as a 70 weight per cent solution in dipropylene glycol | 0.1 |
| Stannous Octoate | 0.3 |
| Silicone Surfactant /2/ | 0.5 |
| Brominated Polyol Flame-Retardant | Varied /3/ |

/1/ This component was a mixture of the 2,4- and 2,6-isomers of tolylene diisocyanate present in a weight ratio of 80:20, respectively. Index 105 designates that the amount of mixture employed was 105 weight per cent of the stoichiometric amount required to react with total reactive hydrogens from the polyether polyol, flame-retardant and water present in the foam formulation.

/2/ A polysiloxane-polyoxyalkylene block copolymer having the average structure:

MeO(C$_3$H$_6$O)$_{29}$(C$_2$H$_4$O)$_{20}$(CH$_2$)$_3$—Me$_3$SiO(Me$_2$SiO)$_{72}$(MeSiO)$_{5.1}$SiMe$_3$ (wherein "Me" represents a methyl group) employed as an approximately 55 weight per cent solution in a solvent medium containing about 90 and 10 weight per cent, respectively, of compounds having the average formulas, C$_4$H$_9$(OC$_2$H$_4$)$_{19}$(OC$_3$H$_6$)$_{14}$OH and C$_9$H$_{19}$C$_6$H$_4$(OC$_2$H$_4$)$_{10.5}$OH.

/3/ The specific proportions employed are given in Table II herein.

The respective foams of Examples II–V were prepared using the following procedure:

The diisocyanate and silicone surfactant were added to a blended suspension of the tetrabromophthalic amide-ester polyol in the polyether polyol contained in a ½-gallon container fitted with a baffle. The resultant mixture was stirred for 60 seconds with a high speed stirrer at 2700 rpm. After the mixture was allowed to stand for 15 seconds, it was stirred for an additional 15 seconds. During the latter period but after 5 seconds had elapsed, the amine catalyst and water were added as a premixed solution and, after the remaining 10-second period of stirring, the stannous octoate was added from a syringe. When the 15 seconds of stirring was completed, the mixture was quickly poured into a mold (14 × 14 × 6 inches) whereupon the respective masses foamed. Both the cream time and rise time were recorded which terms denote the interval of time from the formation of the complete foam formulation to (1) the appearance of a creamy color in the formulation and (2) the attainment of the maximum height of the foam, respectively. The foams were allowed to stand at ambient conditions for 2 days before flammability, physical and mechanical properties were determined. The specific relative proportions of those components of Foam Formulation A which were varied and the foam properties are given in Table II.

The above procedure was also followed in providing the control foam of Run K except, of course, that no flame-retardant was added.

In providing the foam of comparative Run C, the above procedure was also followed except that Compound A (dibromoneopentyl glycol) employed therein was added as a preformed solution in the liquid polyether polyol. The latter solution was prepared by: (1) combining Compound A and polyol in an amount sufficient to provide an 18 weight per cent solution thereof in the polyether polyol; (2) heating the resulting suspension at 70°C. for 1.5 hours to completely solubilize Compound A; and (3) blending the resulting solution in a predetermined amount with additional polyol to provide the relative proportion of Compound A per 100 parts by weight of polyol indicated in Table II.

The flammability properties, determined before and after accelerated aging, were measured in accordance with standard test procedure ASTM D 1692-67 T, with the exception that five samples of each foam were tested. The results are given in Table II below wherein:

"SE" indicates that on the basis of the results obtained in the aforesaid flammability test, the foam is rated as self-extinguishing.

"B" indicates that on the basis of the results obtained in the aforesaid flammability test, at least one of the foam samples burned to such an extent that it did not qualify as a self-extinguishing material; therefore, the foam is given a burning (B) rating.

"Burning Extent" denotes the burned length of the test specimen of foam; the flammability of the foam ASTM D 1564-64 T, after exposure of the foam specimens to the above-described dry heat aging conditions, and are reported as the median values of three test specimens for each foam sample.

Indentation Load Deflection (ILD Values) to 25 and 62% deflections were measured in accordance with ASTM D 1564-64 T, Sections 19–25 (Method A), except that the dimensions of the foam specimens employed were 12 × 12 × 4. The Return Value is the percentage ratio of the load required to support the return 25% indentation after 1 minute as compared to the load required to support the initial 25% indentation after 1 minute. The Load Ratio is the ratio of the 65% and 25% ILD values, respectively.

Compression Set at 90% constant deflection was determined in accordance with Sections 12–18 of ASTM D 1564-64 T, the amount of compression set ($C_t$) being expressed as a per cent of the original specimen thickness and is reported as the median of three test specimens for each foam sample.

TABLE II

| Example No. (Run No.) | (K) | (C) | II | III | IV | V |
|---|---|---|---|---|---|---|
| Foam Formulation A /1/ | | | | | | |
| Diisocyanate, pts. by wt. | 49.8 | 56.2 | 51.70 | 53.76 | 55.80 | 57.80 |
| Flame-Retardant, pts. by wt. | | | | | | |
| Tetrabromophthalyl Amide-Ester Polyol /2/ | — | — | 5 | 10 | 15 | 20 |
| Compound A* | — | 10 | — | — | — | — |
| Weight Per Cent Br in Polymer, Calcd. /3/ | 0 | 3.67 | 1.62 | 3.10 | 4.46 | 5.71 |
| Cream Time, seconds | 8 | 6 | 10 | 8 | 8 | 8 |
| Rise Time, seconds | 78 | 81 | 80 | 74 | 80 | 75 |
| Flammability (ASTM D 1692-67 T) | | | | | | |
| Before Sample Conditioning | | | | | | |
| Rating | B | SE | B | SE | SE | SE |
| Burning Extent, inches | — | 1.8 | — | 4.0 | 2.3 | 1.2 |
| Extinguishing Time, seconds | — | 27 | — | 61 | 34 | 36 |
| After Dry Heat Aging | | | | | | |
| Rating | B | SE | B | SE | SE | SE |
| Burning Extent, inches | — | 2.1 | — | 3.0 | 2.5 | 1.0 |
| Extinguishing Time, seconds | — | 28 | — | 41 | 38 | 39 |
| Foam Properties | | | | | | |
| Density, lbs./ft.$^3$ | 1.50 | 1.51 | 1.58 | 1.67 | 1.73 | 1.82 |
| Tensile Strength, psi | 15.4 | 12.7 | 13.7 | 13.5 | 13.0 | 12.0 |
| Elongation, Per Cent | 147 | 131 | 110 | 97 | 89 | 72 |
| 4-Inch ILD, lbs./50 in.$^2$ | | | | | | |
| 25% Deflection | 38 | 36 | 43 | 46 | 46 | 52 |
| 65% Deflection | 68 | 68 | 80 | 86 | 90 | 109 |
| 25% Return | 25 | 20 | 29 | 31 | 31 | 36 |
| Return Value, Per Cent | 66.0 | 54.9 | 67.4 | 67.0 | 67.1 | 68.9 |
| Load Ratio | 1.78 | 1.9 | 1.9 | 1.9 | 1.9 | 2.1 |
| 90% Compression Set, Per Cent | 5.0 | 73.6 | 6.7 | 8.4 | 0.99 | 1.05 |
| Comments as to Scorching | | | No Scorching Observed | | | |

*Dibromoneopentyl glycol which is not a flame-retardant of this invention.
/1/ The other components of the foam formulation and relative proportions thereof are as given in Table I herein.
/2/ The reaction product produced in accordance with Example I.
/3/ Total weight of polymer was taken as the combined weight of the polyether polyol, diisocyanate and flame-retardant.

is proportional to the burning extent as measured by this test.

"Extinguishing Time" denotes the time taken to give the specified burning extent.

"Dry Heat Aging" indicates that the foam specimen was heated in an oven at 140°C. for 22 hours, as specified in test method ASTM D 1564-64 T, Sections 38–44.

In addition to flammability properties, Table II also indicates various physical and mechanical properties of the foams produced in Examples II–V and Runs K and C which properties were measured by subjecting the foam samples to the following standardized test procedures.

Density was measured as described in Sections 68–73 of ASTM D 1564-64 T except that the test specimens had nominal dimensions of 4 × 4 × 1 inch.

Tensile Strength and Ultimate Elongation were measured in accordance with Sections 81–87 (Suffix T) of The results of Table II show that, notwithstanding the presence of aromatically-bound bromine, the tetrabromophthalyl amide-ester polyol of the present invention provided self-extinguishing flexible polyurethane foams when used in an amount to incorporate a bromine content as low as 3 weight per cent. The results also indicate that the use of the tetrabromophthalyl amide-ester polyol as a flame-retarding agent allows for the preparation of flexible polyurethane foams having a satisfactory combination of physical and mechanical properties. With reference to comparative Run C, it is noted that the dibromoneopentyl glycol (Compound A) employed therein is an aliphatic bromide and that generally such aliphatic bromides are highly efficient flame-retardants. The data of Table II show that the aromatic bromide of this invention compares very favorably in efficiency with the aliphatic bromide employed in Run C. Thus, about 3.67 weight per cent bromine incorporated as dibromoneopentyl glycol gave a burning extent of 1.8 inches while, surprisingly, only 4.46 percent of the aromatic bromide (Example IV) was required to give a burning extent of 2.3 inches, by the aforementioned flammability test ASTM D 1692-67 T.

The efficiency of the tetrabromophthalyl amide-ester polyol produced in Example I was also compared to that of the known tetrabromophthalic anhydride-diethylene glycol-propylene oxide diester having the following formula and designated hereinbelow as Compound B:

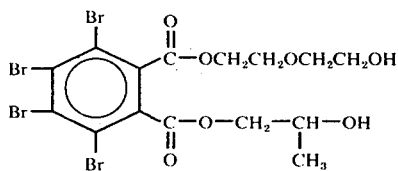

(B)

Compound B was employed in a series of flexible polyurethane foam preparations as the flame-retardant component of Foam Formulation A of Table I above. In carrying out these comparative runs (designated C-1 through C-6) as well as in preparing the control foam (Run K-1), substantially the same procedure described with reference to the foam preparations of Table II was followed. The relative proportions of those components of Foam Formulation A which were varied as well as flammability data (determined by the aforementioned test, ASTM D 1692-67 T) and other foam properties are given in the following Table III.

(Example III of Table II), the foamed product was rated as self-extinguishing, Further, at 6.05 weight per cent bromine incorporated as Compound B (Run C-6), the burning extent of the self-extinguishing foam was 3.0 inches, whereas at 5.71 per cent bromine incorporated as the amide-ester polyol of this invention, the self-extinguishing foam had a burning extent as low as 1.2 inches (Example V).

In addition to the tetrabromophthalyl amide-ester polyol of Example I, other specific illustrative reaction products provided by the present invention and which are useful in providing polyurethane foams are as follows:

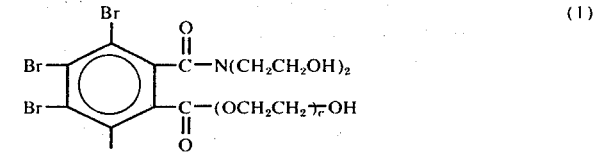

(1)

which is produced by the reaction of tetrabromophthalic anhydride, diethanolamine and ethylene oxide;

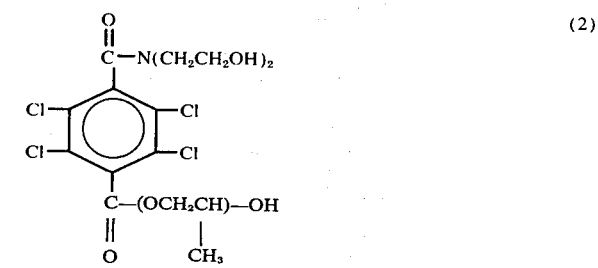

(2)

which is produced by the reaction of tetrachloroterephthaloyl chloride, diethanolamine and propylene oxide;

TABLE III

| Run No. | K-1 | C-1 | C-2 | C-3 | C-4 | C-5 | C-6 |
|---|---|---|---|---|---|---|---|
| Foam Formulation A /1/ | | | | | | | |
| Diisocyanate, pts. by wt. | 49.8 | 50.8 | 51.4 | 52.4 | 53.2 | 54.2 | 55.2 |
| Compound B* | 0 | 4 | 6 | 10 | 13 | 17 | 21 |
| Weight Per Cent Br in Polymer, Calcd. /2/ | 0 | 1.31 | 1.93 | 3.13 | 3.97 | 5.04 | 6.05 |
| Cream Time, seconds | 7 | 7 | 7 | 7 | 7 | 7 | 8 |
| Rise Time, seconds | 79 | 73 | 82 | 77 | 87 | 79 | 95 |
| Flammability (ASTM D 1692-67 T) | | | | | | | |
| Before Sample Conditioning | | | | | | | |
| Rating | B | B | B | B | SE | SE | SE |
| Burning Extent, inches | — | — | — | — | 3.0 | 3.5 | 3.0 |
| Extinguishing Time, seconds | — | — | — | — | 55 | 47 | 55 |
| After Dry Heat Aging | | | | | | | |
| Rating | B | B | B | B | SE | SE | SE |
| Burning Extent, inches | — | — | — | — | 2.8 | 4.0 | 2.4 |
| Extinguishing Time, seconds | — | — | — | — | 50 | 52 | 37 |
| Foam Properties | | | | | | | |
| Density, lbs./ft.³ | 1.54 | 1.78 | 1.58 | 1.60 | 1.66 | 1.66 | 1.71 |
| Tensile Strength, psi | 17.6 | 18.6 | 19.4 | 20.2 | 20.9 | 21.7 | 22.2 |
| Elongation, Per Cent | 189 | 207 | 194 | 218 | 205 | 222 | 214 |
| 4-Inch ILD, lbs./50 in.² | | | | | | | |
| 25% Deflection | 36 | 39 | 42 | 43 | 46 | 44 | 47 |
| 65% Deflection | 65 | 71 | 75 | 80 | 83 | 83 | 87 |
| 25% Return | 24 | 25 | 26 | 26 | 27 | 24 | 24 |
| Return Value, Per Cent | 66 | 63 | 62 | 59 | 58 | 54 | — |
| Load Ratio | 1.83 | 1.83 | 1.80 | 1.85 | 1.80 | 1.88 | 1.86 |
| 90% Compression Set, Per Cent | 5.8 | 10.0 | 15.9 | 74.3 | 78.2 | 82.0 | 83.8 |

*Tetrabromophthalic anhydride-diethylene glycol-propylene oxide diester which is not a flame-retardant of this invention.
/1/ The other components of the foam formulation and the relative proportions thereof are as given in Table I herein.
/2/ Total weight of the polymer was taken as the combined weight of polyol, diisocyanate and flame-retardant.

Comparison of the flammability data of Table III with the data of Examples III-V of Table II, shows that the novel tetrabromophthalyl amide-ester polyol of this invention has a significantly higher efficiency as a flame-retardant than the diester diol. Thus, at 3.13 per cent bromine incorporated as the diester, the foamed product (Run C-3 of Table III) was assigned a burning rating whereas at 3.10 per cent bromine incorporated as the amide-ester flame-retardant of this invention (3)

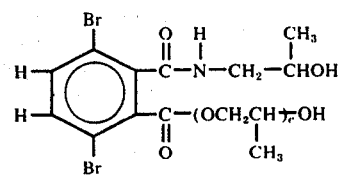

which is produced by the reaction of 3,6-dibromophthalic anhydride, monoisopropanolamine and propylene oxide; and (4)

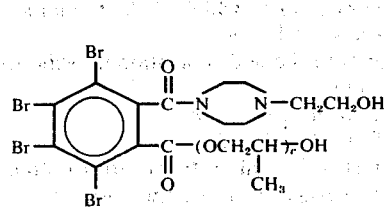

which is provided as the reaction product of tetrabromophthalic anhydride, N-(2-hydroxyethyl)piperazine and propylene oxide. In each of the above formulas, c as hereindefined, has an average value of from about 1 to about 3 and the respective reactions are effected as typically illustrated by Example I, adding sufficient ethylene oxide or propylene oxide until a desired, predetermined Hydroxyl No. is obtained. When mixed ethylene oxide-propylene oxide ester groups are desired, the oxides are added to the reaction mixture sequentially or in admixture with one another.

What is claimed is:

1. A process for producing a flame-retarded flexible polyurethane foam which comprises reacting and foaming a reaction mixture containing: (1) an organic polyisocyanate; (2) a polyether polyol having a hydroxyl number between about 32 and about 150; (3) a flame-retardant comprising a tetrabromophthalyl amide-ester triol having the formula,

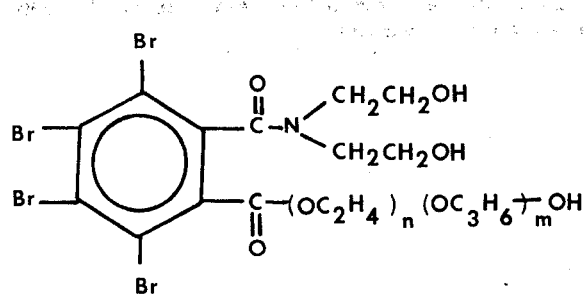

where $n$ and $m$ each has a value of from 0 to about 3 and the sum $n+m$ has an average value of from about 1 to about 3, the said flame-retardant being present in said reaction mixture in an amount sufficient to incorporate in the polyurethane product between about 2 and about 8 weight percent halogen, based on the combined weight of (1), (2) and (3); (4) a blowing agent comprising water; and (5) a catalyst comprising an amine for the polyurethane-forming reaction.

2. A flame-retarded flexible polyurethane foam produced as defined in claim 1.

3. A polyurethane having incorporated therein a halogen-substituted aromatic amide-ester polyol having a formula selected from the group consisting of:

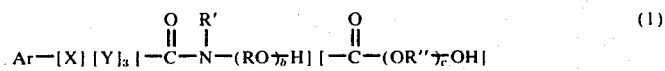 (1)

and

 (2)

wherein:
Ar is a benzene nucleus to which the indicated X, Y, amido and ester groups are bonded;
X is bromine or chlorine and is positioned ortho to the amido group;
Y is hydrogen, bromine or chlorine;
R is a bivalent hydrocarbon group having from 1 to 6 carbon atoms;
$b$ is a number having a value from 1 to 4;
R' is hydrogen, an alkyl group having from 1 to 10 carbon atoms, a bromophenyl radical, a chlorophenyl radical or $-(RO)_bH$, wherein R and $b$ are as aforesaid;
R'' is a bivalent alkylene group having from 2 to 10 carbon atoms; and
$c$ is a positive number having an average value from about 1 to about 3.

4. A polyurethane as defined in claim 3 in which the halo-aryl amide-ester polyol is of formula (1) and each X and Y radical thereof is bromine.

5. A polyurethane as defined in claim 3 in which the halo-aryl amide-ester polyol is of formula (1) and each X and Y radical thereof is chlorine.

6. A polyurethane as defined in claim 3 in which the halo-aryl amide-ester polyol is of formula (1) and —(OR'')$_c$— of the ester group thereof is oxyethylene, oxypropylene or a combination thereof.

7. A polyurethane as defined in claim 3 in which the halo-aryl amide-ester polyol is of formula (2), each X and Y radical thereof is bromine and —(OR'')$_c$— of the ester group is oxyethylene, oxypropylene or a combination thereof.

8. A process for producing a cellular polyurethane which comprises reacting and foaming a reaction mixture containing:
 1. an organic polyisocyanate;
 2. a flame-retardant comprising a halo-aryl amide-ester polyol having a formula selected from the group consisting of:

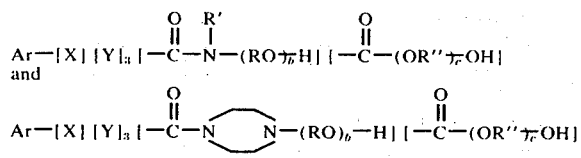

wherein:
Ar is a benzene nucleus to which the indicated X, Y, amido and ester groups are bonded;
X is bromine or chlorine and is positioned ortho to the amido group;
Y is hydrogen, bromine or chlorine;
R is a bivalent hydrocarbon group having from 1 to 6 carbon atoms;
$b$ is a number having a value from 1 to 4;
R' is hydrogen, an alkyl group having from 1 to 10 carbon atoms, a bromophenyl radical, a chlorophenyl radical or $-(RO)_bH$, where R and $b$ are as aforesaid;
R" is a bivalent alkylene group having from 2 to 10 carbon atoms; and
$c$ is a positive number having an average value from about 1 to about 3;
3. a polyol different from polyol (2); and
4. a blowing agent;
said flame-retardant being present in said reaction mixture in an amount sufficient to provide a polyurethane product having a halogen content of between about 0.2 and about 8 weight percent, based on the combined weight of (1), (2) and (3).

9. A process as defined in claim 8 in which the reaction mixture contains an amine catalyst for the polyurethane forming reaction.

10. A process as defined in claim 8 in which the blowing agent is water.

11. A process as defined in claim 8 in which the blowing agent comprises water and a fluorocarbon.

12. A process as defined in claim 8 in which component (3) is a polyether polyol.

13. A process as defined in claim 8 in which component (3) is a polyester polyol.

14. A process as defined in claim 8 in which component (3) is a lactone polyol.

15. A process as defined in claim 8 in which component (3) is a phosphorus-containing polyol.

16. A cellular polyurethane produced in accordance with the process defined in claim 8.

17. A process for producing a polyurethane foam which comprises reacting and foaming a reaction mixture containing:
1. an organic polyisocyanate;
2. a polyether polyol or a polyester polyol;
3. a flame-retardant comprising a halo-aryl amide-ester triol having the formula,

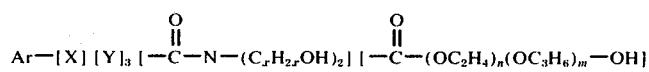

wherein:
Ar is a benzene nucleus to which X, Y, the amido and ester groups are bonded,
X is bromine or chlorine and is positioned ortho to the amido group,
Y is hydrogen, bromine or chlorine,
$x$ has a value from 2 to 4 and
$n$ and $m$ have respective values from zero to three, provided the average value of the sum $n+m$ is from about 1 to about 3;
4. a blowing agent comprising water; and
5. a catalyst comprising a tertiary-amine; said flame-retardant being present in said reaction mixture in an amount sufficient to provide the polyurethane product with a halogen content of between about 0.5 and about 8 weight percent, based on the combined weight of (1), (2) and (3).

18. A process as defined in claim 17 in which the ester group of said amide-ester triol is positioned ortho to the amido group, at least one of the Y radicals is bromine or chlorine, and said Y radical is positioned ortho to the ester group.

19. A process as defined in claim 18 in which the remaining two Y radicals are bromine or chlorine.

20. A process as defined in claim 17 in which the ester group of said amide-ester triol is positioned para to the amido group and each Y radical is bromine or chlorine.

21. A process as defined in claim 17 in which $n$ is zero.

22. A process as defined in claim 17 in which $m$ is zero.

23. A process as defined in claim 17 in which $n$ and $m$ are positive numbers.

* * * * *

UNITED STATES PATENT OFFICE
CERTIFICATE OF CORRECTION

Patent No. 3,974,109  Dated August 10, 1976

Inventor(s) Anthony Joseph Papa and William Robert Proops

It is certified that error appears in the above-identified patent and that said Letters Patent are hereby corrected as shown below:

Column 3, line 60, for "represent" read -- represents --. Column 5, line 31, for "y" read -- Y --. Column 6, line 14, for "y" read -- Y --; line 19, for "uaually" read -- usually --. Column 8, line 37, for "an" read -- and --. Column 10, line 18, for "benzo-" read -- -benzo- --. Column 22, line 9, after "4" and before the period (.), read -- inches --. Column 24, lines 23-33, that portion of the formula reading $$-(OCH_2CH)-OH$$
$$\quad\quad |$$
$$\quad\quad CH_3$$

should read $$-(OCH_2CH)_c-OH$$
$$\quad\quad |$$
$$\quad\quad CH_3$$

Signed and Sealed this

Eighteenth Day of October 1977

[SEAL]

Attest:

RUTH C. MASON
Attesting Officer

LUTRELLE F. PARKER
Acting Commissioner of Patents and Trademarks